(12) United States Patent
Fluhrer

(10) Patent No.: US 7,207,063 B1
(45) Date of Patent: Apr. 17, 2007

(54) METHOD AND APPARATUS FOR DETERMINING SECURE ENDPOINTS OF TUNNELS IN A NETWORK THAT USES INTERNET SECURITY PROTOCOL

(75) Inventor: Scott Fluhrer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 683 days.

(21) Appl. No.: 09/990,814

(22) Filed: Nov. 15, 2001

(51) Int. Cl.
*G06F 9/00* (2006.01)
*G06F 15/16* (2006.01)
*G06F 17/00* (2006.01)
*G06F 15/177* (2006.01)
*G06F 15/173* (2006.01)
*H04L 9/00* (2006.01)

(52) U.S. Cl. .............................. 726/14; 726/12; 726/13; 726/15; 713/151; 713/152; 713/153; 713/154; 709/217; 709/218; 709/219; 709/220; 709/221; 709/222; 709/223; 709/224

(58) Field of Classification Search ........ 713/200–202; 709/217–238; 370/401–469
See application file for complete search history.

(56) References Cited

U.S. PATENT DOCUMENTS 6,631,416 B2 * 10/2003 Bendinelli et al. .......... 709/227
6,823,462 B1 * 11/2004 Cheng et al. ............... 713/201

OTHER PUBLICATIONS

S. Kent et al., "Security Architecture for the Internet Protocol", Nov. 1998, pp. 1-66.

* cited by examiner

*Primary Examiner*—Ayaz Sheikh
*Assistant Examiner*—Longbit Chai
(74) *Attorney, Agent, or Firm*—Hickman Palermo Truong & Becker LLP

(57) ABSTRACT

A method for establishing a secure connection between two network devices, such as a source end host and a destination end host, is disclosed. An initiator peer that sends network traffic on behalf of the source end host sends to a responder peer a first description of network traffic that is to be protected. In response, the initiator peer receives a second description of network traffic that is to be protected from the responder peer. The initiator peer then derives a third description of network traffic that is mutually acceptable to both the initiator peer and the responder peer. The third description of the network traffic is based on the first description of network traffic and the second description of the network traffic. The third description of network traffic is derived by finding the largest common subset of proxies from the first and second descriptions of network traffic.

23 Claims, 6 Drawing Sheets

METHOD AND APPARATUS FOR DETERMINING SECURE ENDPOINTS OF TUNNELS IN A NETWORK THAT USES INTERNET SECURITY PROTOCOL

FIELD OF INVENTION

The present invention relates to security for transmitting network traffic over Internet Protocol networks. The invention relates more specifically to a method and apparatus for determining secure endpoints of tunnels in a network that uses Internet security protocol.

BACKGROUND OF THE INVENTION

Internet Protocol security ("IPSec") is a set of protocols developed by the Internet Engineering Task Force (IETF) to support secure exchange of Internet Protocol ("IP") packets among hosts in a network. IPSec provides security for transmission of sensitive information over open networks such as the Internet and may be implemented in the form of IPSec agents within the operating system of hosts in the network. IPSec acts at the network layer to protect and authenticate IP packets between participating IPSec devices.

Under IPSec, a "secure tunnel" is created when IPSec is used among hosts at separate points in a network for hiding an IP packet, by encapsulating the packet in an IPSec packet with new IP header values. The participating IPSec devices at either end of a secure tunnel are termed "IPSec peers." The IPSec peer that seeks to send an IP packet on behalf of a source end host through a secure tunnel is termed an "initiator peer." The IPSec peer that receives the IP packet on behalf of a destination end host is termed a "responder peer."

FIG. 1 is a block diagram that illustrates a simplified network topology between two end hosts. In FIG. 1, source end host 102 is communicatively coupled to initiator peer 104. Initiator peer 104 is communicatively coupled to responder peer 106. Responder peer 106 is in turn communicatively coupled to destination end host 108. In certain embodiments of the invention, the source end host and the initiator peer may be one device, such as a router or switch executing an IPSec agent. Similarly, the destination end host and the responder peer may be one device.

In operation, source end host 102 generates an IP packet P that is destined for destination end host 108. Initiator peer 104 may be implemented as a router with an encrypting interface on the router's outbound interface. Initiator peer 104 is configured to encrypt IP traffic from subnet W.W.W.W, which includes source end host 102, to subnet X.X.X.X, which includes destination end host 108. Thus, initiator peer 104 protects the proxies (W.W.W.W, X.X.X.X), termed the "initiator peer's full proxy." W.W.W.W alone and X.X.X.X alone each are termed an "initiator peer's half proxy." Subnets W.W.W.W and X.X.X.X may include protocol and port information.

Responder peer 106 is configured to encrypt IP traffic from subnet Y.Y.Y.Y, which includes destination end host 108, to subnet Z.Z.Z.Z, which includes source end host 102. Thus, responder peer 106 protects the proxies (Y.Y.Y.Y, Z.Z.Z.Z), referred to as the "responder peer's full proxy." Y.Y.Y.Y alone and Z.Z.Z.Z alone are each referred to as the "responder peer's half proxy."

The IPSec participating peers between which a secure tunnel is to be established generally need to dynamically determine each other's identity. The IPSec peers associated with the secure tunnel need to know of each other's identity in order to negotiate proxies.

In one approach to determine identity, a dynamic crypto map is defined for responder peers to determine IPSec peers. In another approach, a tunnel endpoint discovery mechanism is used by the initiator peer to dynamically determine an IPSec peer. The responder peer and the initiator peer are each configured with a security policy. The responder peer is not aware of the contents of the initiator peer's security policy, nor does the initiator peer know the contents of the responder peer's security policy. Therefore, a first peer cannot determine if it is permitted to establish a secure tunnel with a second peer based solely on the identity of the second peer.

Referring again to FIG. 1, in order to establish a secure tunnel between source end host 102 and destination end host 108 using IPSec, initiator peer 104 creates a proposal of the types of packets that are to be protected by the secure tunnel that is to be established. A description of the types of packets that will be protected by the secure tunnel is herein referred to as a "proxy." Initiator peer 104 sends the proposal of the types of packets—that is, a proposed set of proxies—to responder peer 106. When responder peer 106 receives the proposed set of proxies, responder peer 106 checks the proposed set of proxies against responder peer's security policy. If the proposed set of proxies does not match responder peer's security policy, then responder peer 106 will refuse to establish the secure tunnel between initiator peer 104 and responder peer 106.

In one approach, initiator peer 104 sends to responder peer 106 the half proxy W.W.W.W, which includes source end host 102. If the half proxy W.W.W.W matches responder peer's security policy, then responder peer 106 sends the responder peer's half proxy Z.Z.Z.Z, which also includes the source end host. Initiator peer 104 then merges the two half proxies in an attempt to obtain a set of proxies, herein referred to as "merged proxies," which is mutually acceptable to both the initiator peer and responder peer. This approach is represented by the Tunnel Endpoint Detection (TED) protocol, versions 1 and 2, as implemented in certain products of Cisco Systems, Inc.

A drawback to this approach is that the merged proxies do not work in all circumstances. For example, the merged proxies (W.W.W.W, Z.Z.Z.Z) will not be acceptable to the responder peer if the responder peer's security policy requires the merged proxies to satisfy responder peer's other half proxy Y.Y.Y.Y.

Moreover, such an approach does not specify the specific transport level protocol that is needed for the network traffic through the secure tunnel, such as TCP, UDP, etc.

Thus, one of the difficulties with deploying ISAKMP/IPSec-based networks is configuring each IPSec host or security gateway with the information required to associate what encrypted traffic should be forwarded to which peer, and which are the necessary proxies that should be used to define what traffic should be protected. The TED approach has been usable only where the initiator could specify the source IP address, and the responder could specify the destination IP address.

Based on the foregoing, there is a clear need for a way to provide for negotiating proxies that are mutually acceptable to the initiator peer and the responder peer under all circumstances.

SUMMARY OF THE INVENTION

The foregoing needs, and other needs that will become apparent for the following description, are achieved in the present invention, which comprises, in one aspect, method and apparatus for determining secure endpoints of tunnels in a network that uses Internet security protocol. A source end host and a destination end host wish to establish a secure connection. An initiator peer that sends network traffic on behalf of the source end host sends to a responder peer a first description of network traffic that is to be protected. In response, the initiator peer receives a second description of network traffic that is to be protected from the responder peer. The initiator peer then derives a third description of network traffic that is mutually acceptable to both the initiator peer and the responder peer. The third description of the network traffic is based on the first description of network traffic and the second description of the network traffic.

According to certain features of this aspect, the third description of network traffic is derived by finding the largest common subset of proxies from the first and second descriptions of network traffic.

In one particular embodiment, a TED probe message from a first host includes a summary of the packet that the first host wants to protect with an IPSec tunnel. The responder can reply with its crypto policy, and then the initiator can take both its policy and the responder's policy and determine a joint policy that is acceptable to both the initiator and the responder. As a result, IPSec tunnels that protect specific transport protocols can be negotiated; IPSec tunnels that protect specific ports can be negotiated; and proxies can be negotiated in cases in which there are non-trivial proxy restrictions imposed by the initiator on the destination proxies, or by the responder on the source proxies.

Other aspects and features will become apparent from the following description. For example, in other aspects, the invention encompasses a computer apparatus and a computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining secure endpoints of tunnels in a network that uses Internet security protocol is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The description is presented according to the following general outline: FUNCTIONAL OVERVIEW; TUNNEL END DISCOVERY PAYLOADS; INITIATOR PEER PAYLOAD; RESPONDER PEER PAYLOAD; INTERSECTION OF PROXIES; HARDWARE OVERVIEW; EXTENSIONS AND ALTERNATIVES.

1.0 Functional Overview

Figure 2:
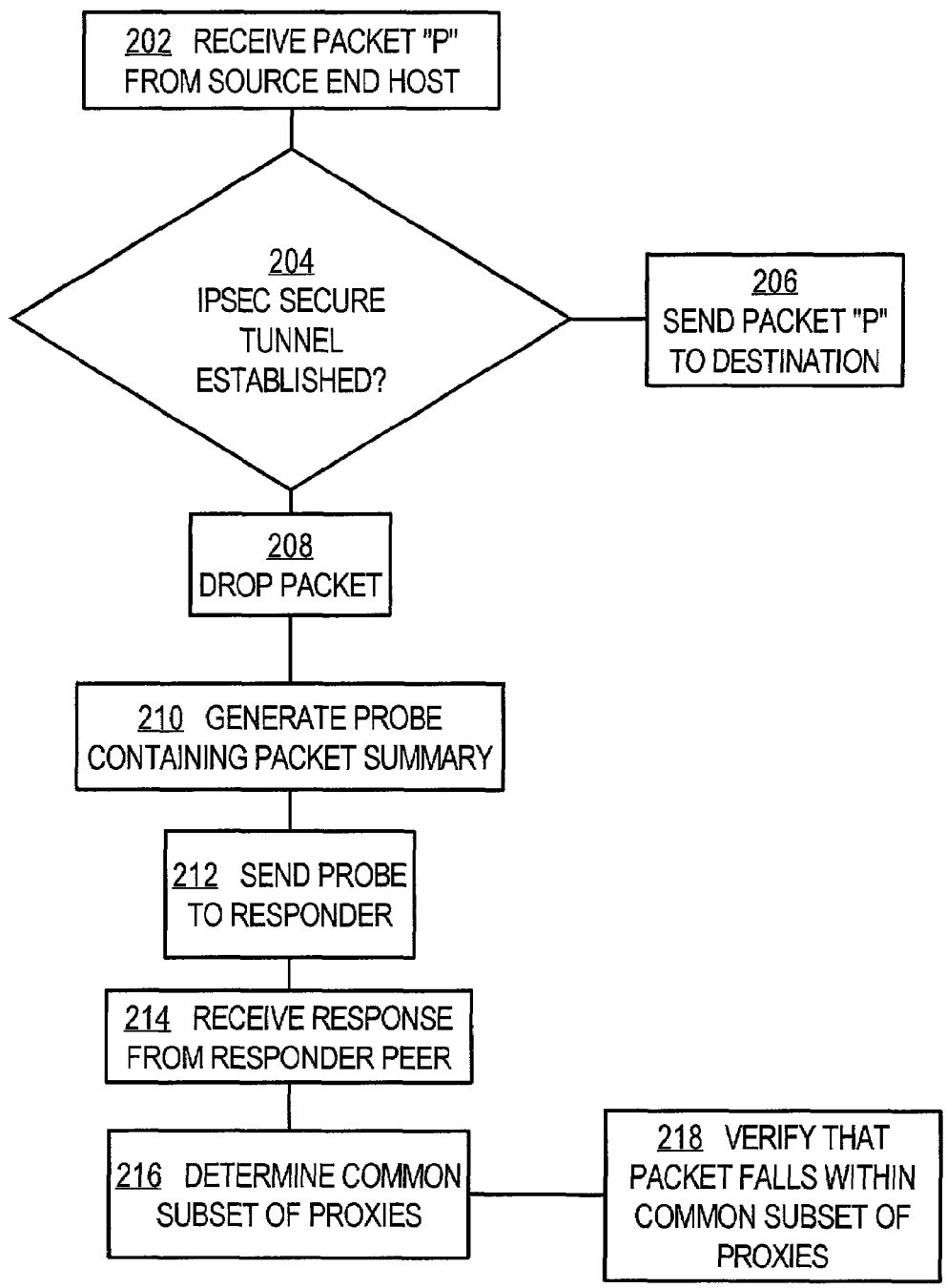
FIG. 2 is a flowchart that illustrates the functional overview of establishing a secure connection for transmitting network traffic over IP networks.

FIG. 2 is a flowchart that illustrates a functional overview of a method for determining secure endpoints of tunnels in a network that uses Internet security protocol. Using the method of FIG. 2, a secure connection for transmitting network traffic over IP networks may be established. In one specific embodiment, the secure connection is an IPSec secure tunnel.

Figure 1:
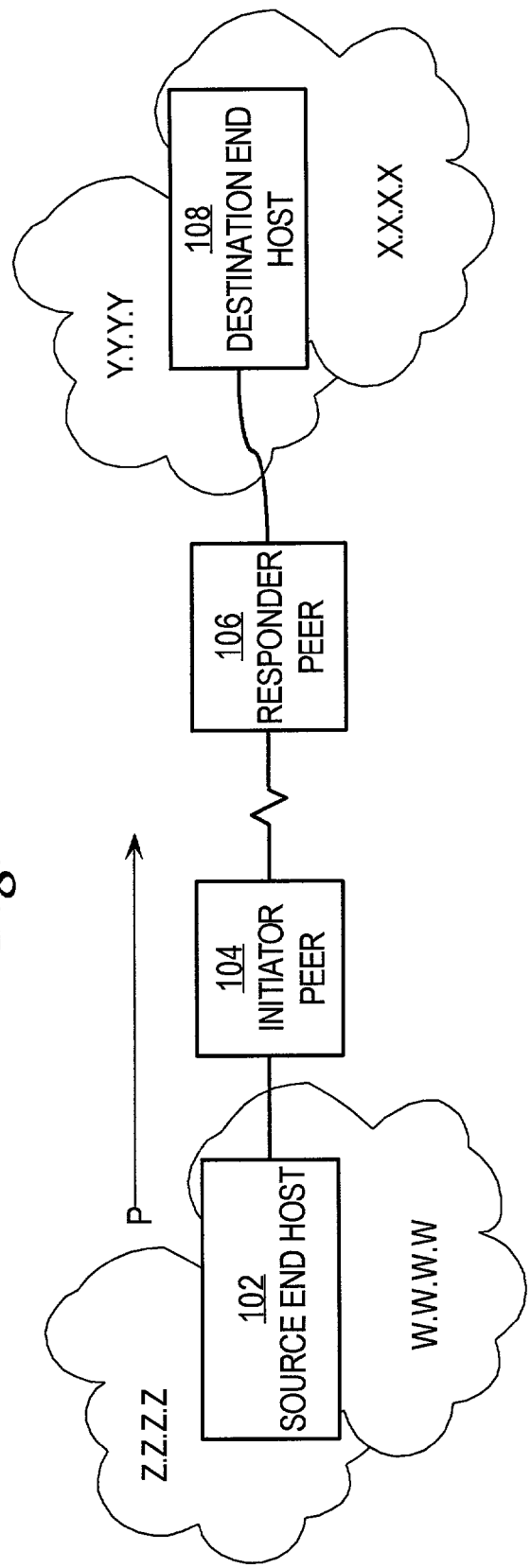
FIG. 1 is a block diagram that illustrates a simplified network topology between two end hosts.

For purposes of illustrating a specific example, FIG. 2 is described herein with reference to the hypothetical network of FIG. 1. However, embodiments are not limited to the specific context shown in FIG. 1.

At block 202 of FIG. 2, an initiator peer receives a packet from a source. For example, initiator peer 104 of FIG. 1 receives an IP packet, P, from source end host 102. The packet is marked or otherwise identified as requiring secure treatment in the network. For example, the Security Policy Database on initiator peer 104 demands that packets matching a particular description must be secured using IPSec. Packet P comprises a header that includes the conventional "5-tuple" of values as defined in IP, namely, a source IP address value, destination IP address value, source port value, destination port value, and protocol identifier.

At block 204, a test is performed to determine whether an IPSec secure tunnel has been established. For example, initiator peer 102 determines whether an IPSec secure tunnel has already been established in the network. If initiator peer 102 determines that an IPSec secure tunnel has already been established, then initiator peer 104 sends packet P through the IPSec tunnel that has already been established to the destination end host 108, as shown by block 206.

However, if initiator peer 102 determines that an IPSec secure tunnel is not currently established, then at block 208, the initiator peer 104 drops packet P. The packet P is dropped because no secure tunnel exists and therefore the initiator peer 104 cannot forward the packet as required by the marking of the packet. Anticipating arrival of another packet that is similarly marked, however, initiator peer 104 then attempts to set up a secure tunnel.

Accordingly, at block 210, initiator peer 104 generates an exploratory packet for the purpose of discovering the identity of the endpoint of the secure tunnel that is to be established. The exploratory packet is also termed a Tunnel Endpoint Discovery ("TED") probe. In certain embodiments, the TED probe is an Internet Key Exchange ("IKE") message that includes a source port value corresponding to the source port value of packet P, and a pre-defined destination port value. In one specific embodiment, the destination port value is set to "500," which is a pre-defined value that specifically identifies the packet as an IKE message. The IKE message is of exchange type "240", which specifically identifies the packet as a TED probe, and has a message ID value of "0." The message further comprises a unique cookie value as its initiator cookie, a string of zero values as its responder cookie, and is unencrypted. The source IP address in the IP header of the probe is the IP address of source end host 102 as found in packet P. The destination IP address in the IP header of the probe is the IP address of destination end host 108, also obtained from packet P.

The TED probe further comprises a payload segment that contains a packet summary. The packet summary contains a description of the type of network traffic that initiator peer 104 expects to be protected by the secure tunnel. The nature and contents of the packet summary are explained in greater detail herein.

At block 212, the probe is sent to a responder. For example, initiator peer 104 sends the TED probe to responder peer 106 of FIG. 1. According to certain embodiments, when responder peer 106 receives the TED probe, responder peer 106 determines whether values in the packet summary match any values in one or more access control lists ("ACLs") that are in a Security Policy Database ("SPD") of the responder peer.

At block 214, initiator peer 104 receives a response from the responder peer. For example, the response is an IKE message of exchange type "241," has a message ID of zero, the same cookie as the initiator cookie, a unique cookie as the responder cookie, and is unencrypted. The source IP address in the IP header of the response is the IP address of responder peer 106. The destination IP address in the IP header of the response is the IP address of initiator peer 104. The response contains information identifying the proxies that responder peer 106 protects on behalf of destination end host 108. The response is explained in greater detail herein.

At block 216, initiator peer determines a common subset of proxies based on both the TED response and on description of the type of network traffic that initiator peer 104 expects to be protected by the secure tunnel.

At block 218, initiator peer 104 verifies that packet P falls within the common subset of proxies. If packet P falls within the common subset of proxies, then a secure tunnel is ready to be established for sending network traffic source end host 102 to destination end host 108.

2.0 Tunnel Endpoint Discovery Payloads 2.1 Initiator Peer Payload

According to one specific embodiment, the TED probe sent by initiator peer 104 comprises a Vendor Payload, ID Payload, Proxy Address, and Summary Packet. The Vendor Payload may comprise a vendor ID value and one or more capability flags. The ID Payload comprises an ID value that uniquely identifies initiator peer 104. For example, the ID Payload may comprise an encoded IP address of initiator peer 104. The purpose of the ID payload is to give responder peer 106 an IP address to which a response can be sent.

The Proxy Address value is the proxy address of source end host 102. In one embodiment, the proxy address of source end host 102 can be omitted from the TED probe sent by the initiator.

According to one specific embodiment, the Summary Packet comprises: (1) a hash value based on a string value that identifies the maker of equipment that is sending the probe, such as an MD5 hash of the string "Cisco TED Probe version #3"; (2) a protocol version number associated with the endpoint discovery process as a whole; (3) an IP protocol version value, such as "4" for IPv4, or "6" for IPv6, etc.; (5) an IP address value of the source end host; (6) an IP address value of the destination end host; (7) a source port value from packet P, if any; and (8) a destination port value from packet P, if any.

2.2 Responder Peer Payload

In one specific embodiment, the response sent by responder peer 106 comprises a Vendor Payload, ID Payload, and TED Response Payload. An example of the Vendor Payload is the vendor ID, which includes capability flags. The ID Payload is a unique identifier of responder peer 106, i.e., the encoded as an IP address of responder peer 106.

The TED Response Payload comprises (1) an IP protocol version value identifying the version of IP used by the proxies that the responder peer protects, such as "4" for IPv4, or "6" for IPv6, etc.; (2) values identifying the source and destination port that responder peer protects; and (3) values identifying the proxy addresses that responder peer 106 protects (e.g., the responder peer's full proxy). For example, referring to the example of FIG. 1, the full proxy that responder peer 106 protects is (Y.Y.Y.Y, Z.Z.Z.Z).

3.0 Intersection Proxy

Figure 3A:
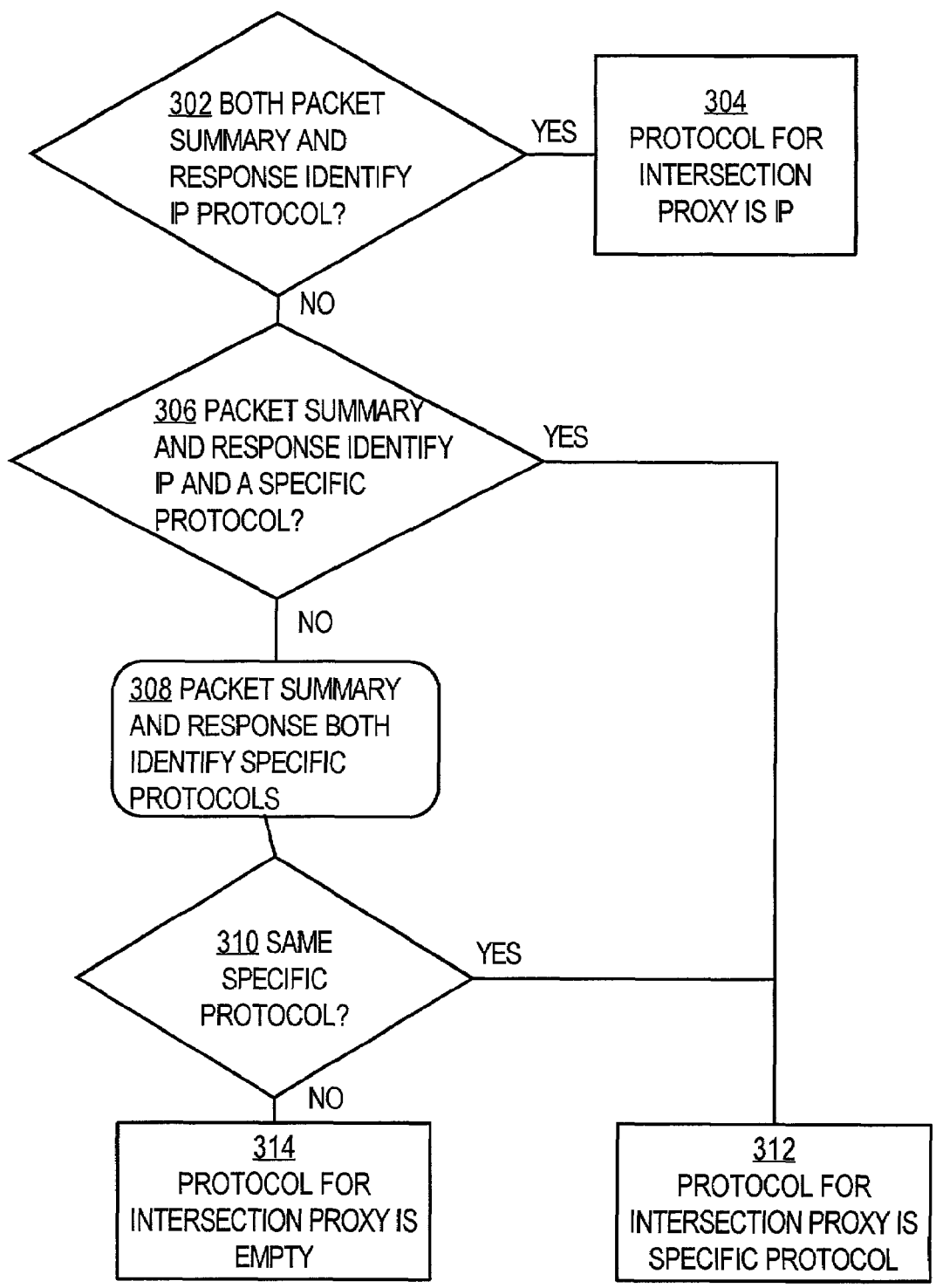
FIG. 3A is a flowchart that illustrates a technique for determining protocol information for the common subset of proxies.
Figure 3B:
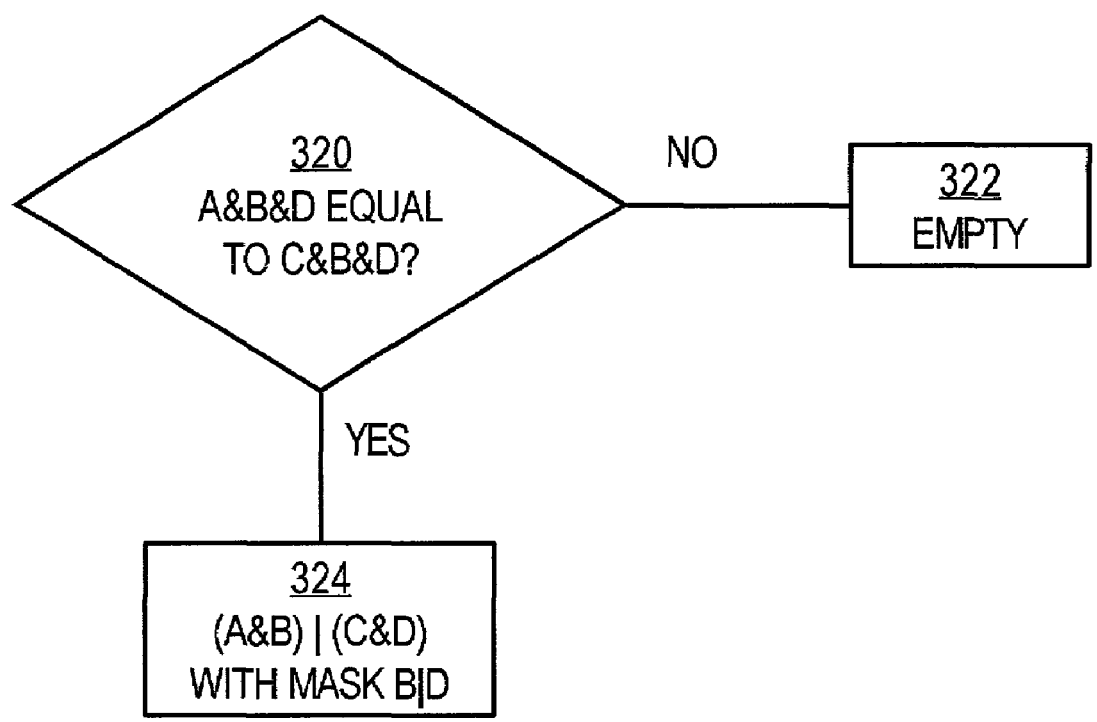
FIG. 3B is a flowchart that illustrates a technique for determining the proxy addresses that comprise the common subset of proxies.
Figure 3C:
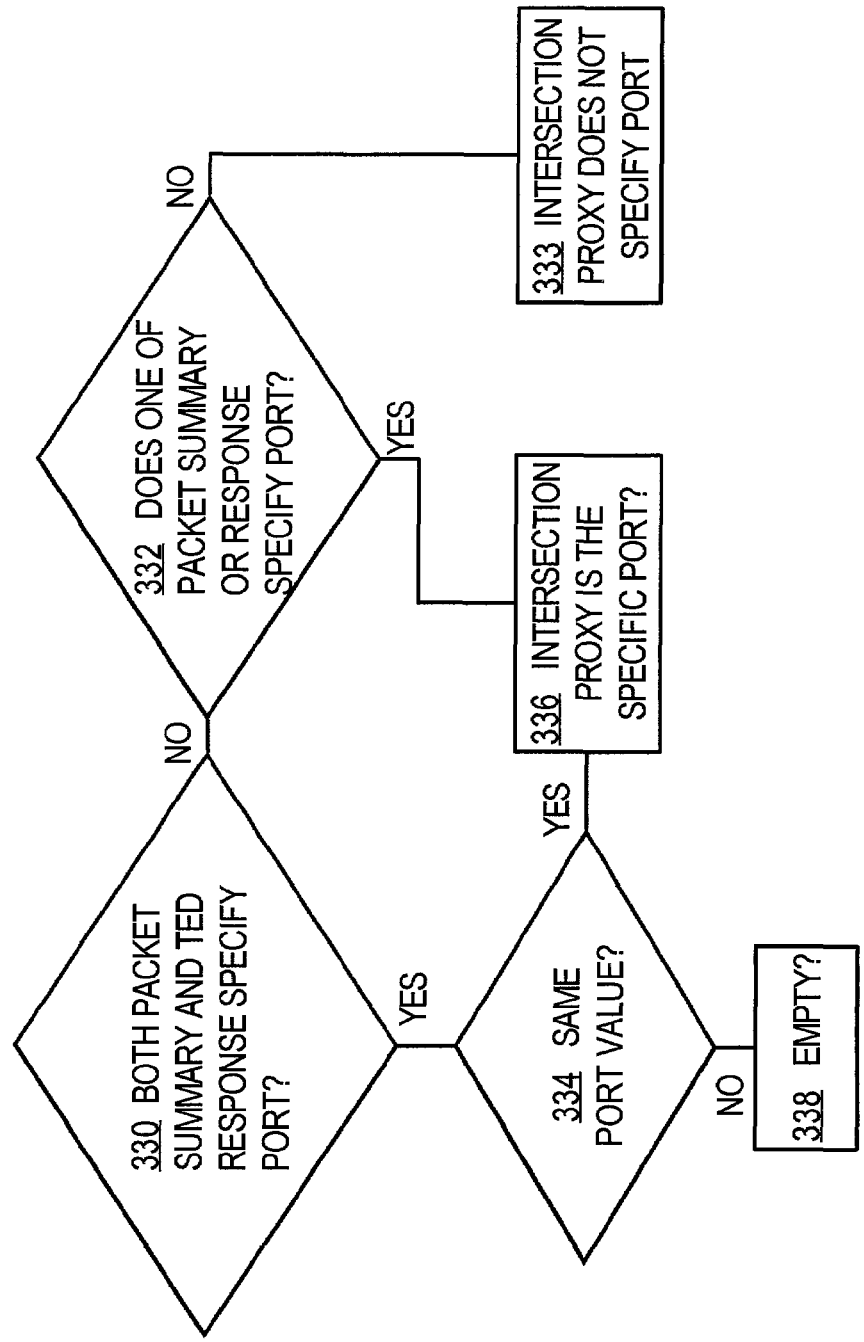
FIG. 3C is a flowchart that illustrates a technique for determining port information for the common subset of proxies.

FIG. 3A, FIG. 3B and FIG. 3C are flowcharts that together illustrate one approach for determining a common subset of proxies based on the full proxy of the initiator peer and the full proxy of the responder peer.

FIG. 3A is a flowchart that illustrates a method for determining what protocol to use for the common subset of proxies (or "intersection of proxies").

At block 302, the initiator peer determines whether both the packet summary and the response specify the IP protocol. If both the packet summary and the TED response specify the IP protocol, then at block 304 the protocol for the intersection proxy is determined to be the IP protocol.

Otherwise, at block 306, the initiator peer determines whether one of the packet summary and the TED response identifies IP, and the other identifies a specific protocol. In that case, control flows to block 312, at which the protocol for the intersection proxy is determined to be the specific protocol. If the result of the test of block 306 is false or NO, then the packet summary and the response both identify specific protocols, as noted in block 308. In block 310, the initiator peer determines whether the specific protocols specified by the packet summary and the TED response are the same. If the initiator peer determines that the specific protocols specified by the packet summary and the TED response are the same, then control passes to block 312, at which the protocol for the intersection proxy is determined to be the specific protocol. Otherwise, at block 314, the protocol for the intersection proxy is assigned an empty value, because the packet summary and response contain specific protocol information that cannot be reconciled.

FIG. 3B is a flowchart that illustrates a technique for determining the proxy addresses for the proxy intersection. As an example, assume that the IP addresses are represented as follows: initiator peer's full proxy is represented by A with mask B, and responder peer's full proxy is represented by C with mask D (where a zero bit in the mask specifies that the bit is ignored when determining whether a specific IP address is included within the proxy). Assume that A and C are expressed in binary.

At block 320 of FIG. 3B, the initiator peer determines whether A&B&D is equal to C&B&D, where "&" represents a logical AND operation. If A&B&D is equal to C&B&D, then at block 324, the initiator peer determines that the intersection proxy comprises the proxy address represented by the intersection of (A&B) with (C&D). The corresponding mask is the intersection of B with D. Otherwise, if the initiator peer determines that A&B&D is not equal to C&B&D, then at block 322, it is determined that no intersection proxy exists.

To illustrate a specific example, assume the following:
A=10.11.0.0
B=255.255.0.0
C=10.0.0.0
D=255.0.0.0

Then:
A&B&D=10.11.0.0 & 255.255.0.0 & 255.0.0.0=10.0.0.0
C&B&D=10.0.0.0 & 255.255.0.0 & 255.0.0.0=10.0.0.0

Because A&B&D=C&B&D, the intersection proxy comprises:
(A&B)|(C&D)=(10.11.0.0 & 255.255.0.0)|(10.0.0.0 & 255.0.0.0)
=1. 11.0.0|10.0.0.0
=10.11.0.0

The mask is B|D=255.255.0.0|255.0.0.0=255.255.0.0

FIG. 3C is a flowchart that illustrates a technique for determining port information for the proxy intersection.

At block 330 of FIG. 3C, the initiator peer determines whether both the packet summary and the TED response specify port values. If both the packet summary and the TED response specify port information, then at block 334, the initiator peer determines whether both the packet summary and response identify the same port. If both the port values are the same, then in block 336, the port value of the intersection proxy is set to the port value identified in the packet summary and response.

However, if the port values specified in the packet summary and response do not identify the same port, then control flows to block 338, in which an empty port value is assigned to the intersection proxy. An empty value is used because the packet summary and response each contain conflicting port values.

If the test of block 330 is false, such that fewer than both the packet summary and response specify a port value, then in block 332 the initiator peer determines whether one of the packet summary and response contains a port value. If so, the control flows to block 336, in which the port value of the intersection proxy is set to the port value identified in the packet summary or response, as appropriate.

If the test of block 332 is false, then neither the packet summary nor the response identifies a port. Therefore, the intersection proxy also does not specify a port, as indicated by block 333.

4.0 Hardware Overview

Figure 4:
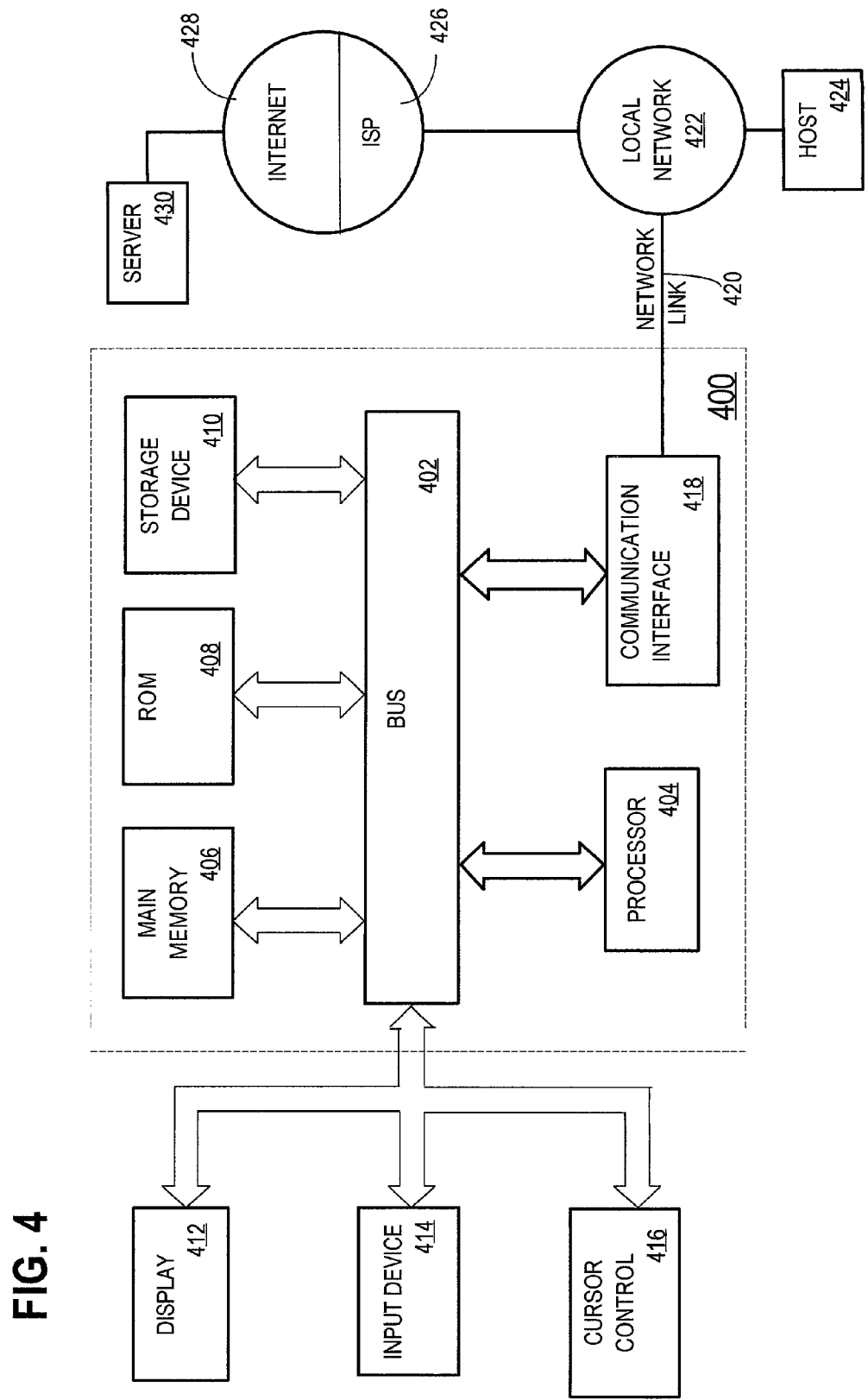
FIG. 4 is a block diagram that illustrates a computer system upon which an embodiment may be implemented.

FIG. 4 is a block diagram that illustrates a computer system 400 upon which an embodiment of the invention may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. In one particular embodiment, a TED probe message from a first host includes a summary of the packet that the first host wants to protect with an IPSec tunnel. The responder can reply with its crypto policy, and then the initiator can take both its policy and the responder's policy and determine a joint policy that is acceptable to both the initiator and the responder. As a result, IPSec tunnels that protect specific transport protocols can be negotiated; IPSec tunnels that protect specific ports can be negotiated; and proxies can be negotiated in cases in which there are non-trivial proxy restrictions imposed by the initiator on the destination proxies, or by the responder on the source proxies. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for determining secure endpoints of tunnels in a network that uses Internet security protocol, comprising:

a network interface that is coupled to the network for receiving one or more packet flows therefrom;

a processor;

one or more stored sequences of instructions which, when executed by the processor, cause the processor to carry out the steps of:

sending from a first network device a first description of network traffic that is to be protected, wherein the first description comprises a first set of network addresses;

receiving, at the first network device and from a second network device, a second description of network traffic that is to be protected, wherein the second description comprises a second set of network addresses;

creating and storing a third description of network traffic that is to be protected based on determining a logical intersection of the first description of network traffic and the second description of network traffic, wherein the step of creating and storing a third description further comprises the step of determining a largest common subset between the first set of network addresses and the second set of network addresses; and establishing the secure connection between the first network device and the second network device based on the third description of network traffic; and wherein the first description comprises a packet summary value that summarizes packets in the network traffic to be protected, and wherein the second description is generated by the second network device based on comparing the packet summary value to one or more access control lists that are managed by the second network device.

2. The apparatus of claim 1, wherein the first description comprises a first protocol and the second description comprises a second protocol, and further comprising sequences of instructions which, when executed by the processor, cause the processor to perform the steps of determining a third protocol for the third description based on determining a logical intersection of the first protocol and the second protocol.

3. The apparatus of claim 2, wherein the sequences of instructions that cause the processor to perform determining the third protocol comprise sequences of instructions which, when executed by the processor, cause the processor to perform:

determining that the third protocol is IP when both the first description and the second description identify IP as a protocol;

determining that the third protocol is a specific protocol when the first description identifies IP and the second description identifies a non-IP protocol;

determining that the third protocol is a either an IP or non-IP protocol when both the first description and the second description identify the same protocol of either an IP or non-IP protocol.

4. The apparatus of claim 1, wherein the first description of network traffic comprises a packet summary that includes:

IP protocol information that is associated with the network traffic emanating from a source end host, wherein the source end host is associated with the first network device;

port information that is associated with the source end host;

port information that is associated with a destination end host, wherein the destination end host is associated with the second network device;

an IP address that is associated with the source end host;

an IP address that is associated with the destination end host; and a proxy address of the source end host; and wherein the second description is generated by the second network device based on comparing the packet summary to one or more access control lists that are managed by the second network device.

5. The apparatus of claim 1, further comprising sequences of instructions which, when executed by the processor, cause the processor to perform:

determining, at the second network device, whether the packet summary matches a security policy information that is associated with the second network device;

wherein the packet summary is associated with the first description of network traffic.

6. The apparatus of claim 1, wherein the second description of network traffic comprises a response that includes:

IP protocol information that is associated with the network traffic emanating from a destination end host, wherein the destination end host is associated with the second network device;

an IP address that is associated with the second network device; and proxy addresses that are associated with a destination end host.

7. The apparatus of claim 6, wherein the proxy addresses that are associated with the destination end host include a first subnet that includes the destination end host and a second subnet that includes a source end host, wherein the source end host is associated with the first network device.

8. The apparatus of claim 1, wherein the sequences of instructions that cause the processor to perform deriving a third description of network traffic further comprise sequences of instructions which, when executed by the processor, cause the processor to perform:

determining based on the first description of network traffic and the second description of network traffic a first intersection proxy comprising protocol information;

determining based on the first description of network traffic and the second description of network traffic a second intersection proxy comprising port information; and determining based on the first description of network traffic and the second description of network traffic a third intersection proxy comprising proxy address information.

9. The apparatus of claim 1, further comprising sequences of instructions which, when executed by the processor, cause the processor to perform the steps of:

receiving at the first network device an IP packet from a source end host that is associated with the first network device;

verifying that the IP packet falls within the third description of network traffic.

10. The apparatus of claim 1, wherein the first description comprises a first port value and the second description comprises a second port value, and further comprising the steps of determining a third port value for the third description based on determining a logical intersection of the first port value and the second port value.

11. The apparatus of claim 10, wherein the sequences of instructions that cause the processor to perform determining the third port value comprises sequences of instructions which, when executed by the processor, cause the processor to perform the steps of:

determining that the third port value is a specific port value when both the first description and the second description identify the same specific port value;

determining that the third port value is a specific port value when one of the first description and the second description identify the specific port value.

12. The apparatus of claim 1, wherein the network addresses comprise a network address and a network mask.

13. An apparatus for determining secure endpoints of tunnels in a network that uses Internet security protocol, comprising:

means for sending from a first network device a first description of network traffic that is to be protected, wherein the first description comprises a first set of network addresses;

means for receiving, at the first network device and from a second network device, a second description of network traffic that is to be protected, wherein the second description comprises a second set of network addresses;

means for creating and storing a third description of network traffic that is to be protected based on determining a logical intersection of the first description of network traffic and the second description of network traffic, wherein the step of creating and storing a third description further comprises the step of determining a largest common subset between the first set of network addresses and the second set of network addresses; and means for establishing the secure connection between the first network device and the second network device based on the third description of network traffic; and wherein the first description comprises a packet summary value that summarizes packets in the network traffic to be protected, and wherein the second description is generated by the second network device based on comparing the packet summary value to one or more access control lists that are managed by the second network device.

14. The apparatus of claim 13, wherein the network addresses comprise a network address and a network mask.

15. The apparatus of claim 13, wherein the first description comprises a first protocol and the second description comprises a second protocol, and further comprising sequences of instructions which, when executed by the processor, cause the processor to perform the steps of determining a third protocol for the third description based on determining a logical intersection of the first protocol and the second protocol.

16. The apparatus of claim 15, wherein the sequences of instructions that cause the processor to perform determining the third protocol comprise sequences of instructions which, when executed by the processor, cause the processor to perform:

determining that the third protocol is IP when both the first description and the second description identify IP as a protocol;

determining that the third protocol is a specific protocol when the first description identifies IP and the second description identifies a non-IP protocol;

determining that the third protocol is a either an IP or non-IP protocol when both the first description and the second description identify the same protocol of either an IP or non-IP protocol.

17. The apparatus of claim 13, wherein the first description of network traffic comprises a packet summary that includes:

IP protocol information that is associated with the network traffic emanating from a source end host, wherein the source end host is associated with the first network device;

port information that is associated with the source end host;

port information that is associated with a destination end host, wherein the destination end host is associated with the second network device;

an IP address that is associated with the source end host;

an IP address that is associated with the destination end host; and a proxy address of the source end host; and wherein the second description is generated by the second network device based on comparing the packet summary to one or more access control lists that are managed by the second network device.

18. The apparatus of claim 13, further comprising sequences of instructions which, when executed by the processor, cause the processor to perform:

determining, at the second network device, whether the packet summary matches a security policy information that is associated with the second network device;

wherein the packet summary is associated with the first description of network traffic.

19. The apparatus of claim 13, wherein:

said first network device comprises a first endpoint host associated with the first network device; and said second network device comprises a second endpoint host associated with the second network device.

20. A method for determining secure endpoints of tunnels in a network that uses Internet security protocol, the method comprising the computer-implemented steps of:

receiving, at a second network device and from a first network device, a first description of network traffic that is to be protected, wherein the first description comprises a first set of network addresses;

in response to receiving the first description of network traffic, creating and sending to the first network device a second description of network traffic that is to be protected, wherein the second description comprises a second set of network addresses;

receiving at the second network device a third description of network traffic that is to be protected from the first network device based on a logical intersection of the first description of network traffic and the second description of network traffic, wherein the third description comprises a largest common subset between the first set of network addresses and the second set of network addresses; and establishing the secure connection between the first network device and the second network device based on the third description of network traffic; and wherein the first description comprises a packet summary value that summarizes packets in the network traffic to be protected, and wherein the second description is generated by the second network device based on comparing the packet summary value to one or more access control lists that are managed by the second network device.

21. A method for determining secure endpoints of tunnels in a network that uses Internet security protocol, the method comprising the computer-implemented steps of:

sending from a first network device a first description of network traffic that is to be protected, wherein the first description comprises a first set of network addresses;

receiving, at the first network device and from a second network device, a second description of network traffic that is to be protected, wherein the second description comprises a second set of network addresses;

creating and storing a third description of network traffic that is to be protected based on determining a logical intersection of the first description of network traffic and the second description of network traffic, wherein the step of creating and storing a third description further comprises the step of determining a largest common subset between the first set of network addresses and the second set of network addresses; and establishing the secure connection between the first network device and the second network device based on the third description of network traffic; and wherein the first description comprises a packet summary value that summarizes packets in the network traffic to be protected, and wherein the second description is generated by the second network device based on comparing the packet summary value to one or more access control lists that are managed by the second network device.

22. A computer-readable medium carrying one or more sequences of instructions for determining secure endpoints of tunnels in a network that uses Internet security protocol, which instructions, when executed by one or more processors, cause the one or more processors to carry out the steps of:

sending from a first network device a first description of network traffic that is to be protected, wherein the first description comprises a first set of network addresses;

receiving, at the first network device and from a second network device, a second description of network traffic that is to be protected, wherein the second description comprises a second set of network addresses;

creating and storing a third description of network traffic that is to be protected based on determining a logical intersection of the first description of network traffic and the second description of network traffic, wherein the step of creating and storing a third description further comprises the step of determining a largest common subset between the first set of network addresses and the second set of network addresses; and establishing the secure connection between the first network device and the second network device based on the third description of network traffic; and wherein the first description comprises a packet summary value that summarizes packets in the network traffic to be protected, and wherein the second description is generated by the second network device based on comparing the packet summary value to one or more access control lists that are managed by the second network device.

23. A computer-readable medium carrying one or more sequences of instructions for establishing a secure connection between two network devices, which instructions, when executed by one or more processors, cause the one or more processors to carry out the steps of:

receiving, at a second network device and from a first network device, a first description of network traffic that is to be protected, wherein the first description comprises a first set of network addresses;

in response to receiving the first description of network traffic, creating and sending to the first network device a second description of network traffic that is to be protected, wherein the second description comprises a second set of network addresses;

receiving at the second network device a third description of network traffic that is to be protected from the first network device based on a logical intersection of the first description of network traffic and the second description of network traffic, wherein the third description comprises a largest common subset between the first set of network addresses and the second set of network addresses; and establishing the secure connection between the first network device and the second network device based on the third description of network traffic; and wherein the first description comprises a packet summary value that summarizes packets in the network traffic to be protected, and wherein the second description is generated by the second network device based on comparing the packet summary value to one or more access control lists that are managed by the second network device.

* * * * *